April 3, 1951      R. C. HILLIARD      2,547,526
LIQUID LEVEL INDICATOR

Filed Jan. 13, 1948

*INVENTOR.*
ROBERT C. HILLIARD
BY Kenway Jenney Witter + Hildreth
ATTORNEYS

Patented Apr. 3, 1951

2,547,526

UNITED STATES PATENT OFFICE 2,547,526

LIQUID LEVEL INDICATOR

Robert C. Hilliard, Beverly Farms, Mass.

Application January 13, 1948, Serial No. 2,090

2 Claims. (Cl. 177—311)

The present invention relates to liquid level indicators and more particularly to devices for giving a remote indication of the level of liquid in a tank as, for example, in an oil tank.

In the filling of fuel oil tanks considerable care must be taken to prevent overflow or spilling. It has been proposed to use a whistle or other sound-producing device in the vent pipe to indicate when the tank is filled or nearly filled. This type of apparatus has a number of disadvantages, of which one is the fact that it introduces a resistance to the free venting of the tank.

The object of the present invention is to provide a tank level indicator which is particularly useful for drivers of oil delivery trucks and which will give a positive indication of the filling of the tank.

With this and other objects in view as will hereinafter appear, the present invention comprises a pressure-responsive device within the tank which may be connected to a remote signal station. The pressure responsive device in the tank is connected electrically to an outlet in the wall of the building. This may be connected to a signal unit which is carried by the oil delivery truck. Upon occurrence of a predetermined hydrostatic pressure on the unit, a signal is given to the driver.

It is important for the driver to know that the unit is in working order so that reliance will not be placed upon it if the pressure-responsive device is inoperative or if the batteries are low. To this end there is provided a test device whereby a test signal may be obtained by the operator prior to filling the tank. The test unit is constructed so that it will fail to give any signal under marginal conditions, whereby the operator is assured that if a test signal is given, the unit will operate properly to give an indication of a filled tank.

Figure 1:
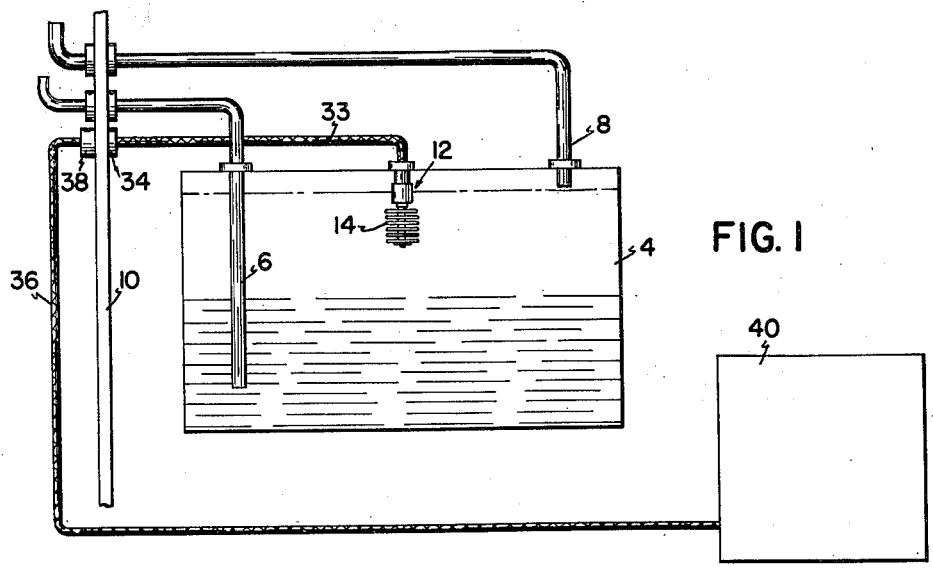
Figure 2:
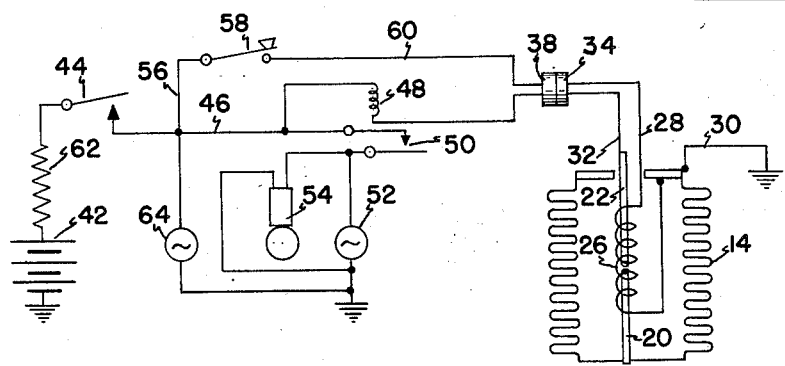

In the accompanying drawings Fig. 1 is a diagrammatic elevation of an oil tank with a unit according to the present invention; Fig. 2 is a wiring diagram and Fig. 3 is a detail view of the pressure-responsive device.

As shown in Fig. 1 there is an oil tank 4 on the customer's property. Associated with the tank are the usual filler pipe 6 and the vent pipe 8, both of which protrude through the outer wall of the building, indicated diagrammatically at 10.

Included in the unit is a pressure-responsive device 12. This unit comprises a bellows 14 which contracts to close a circuit, as will be presently described, when the hydrostatic pressure reaches a certain value, indicative of the filling of the tank.

Figure 3:
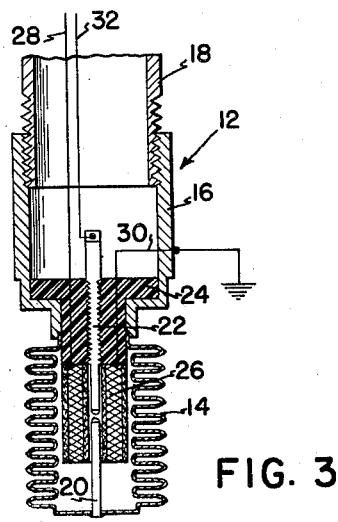

As shown in Fig. 3 the bellows 14 is secured to a hollow head 16 which in turn is secured to a pipe 18 suitably mounted in the tank. Received within the bellows is a movable contact member 20 adapted to engage a fixed contact member 22 when the bellows is compressed by a predetermined amount. The contact 22 is adjustably mounted in a supporting body of insulating material indicated at 24.

A solenoid 26 surrounds the contact 20. The contact 20 is of magnetic material whereby when the solenoid is energized it will cause engagement of the contacts 20 and 22. Thus contact may be made either by compression of the bellows due to hydrostatic pressure, or by energization of the solenoid. A wire 28 is connected to one terminal of the solenoid, the other terminal of which is connected through a wire 30 with the head 16, the latter being grounded to the tank as indicated by the symbolic ground connection in Fig. 3. A wire 32 connects with the upper fixed contact 22. The wires 28 and 32 pass through the pipe 18 and are enclosed in a cable 33 which runs to an electrical outlet connector 34 mounted in the wall of the building. When it is desired to use the device, a cable 36 provided with a plug 38 is connected to the connector 34. The cable 36 leads to the signal box which is indicated diagrammatically in Fig. 1 by the character 40.

As shown in Fig. 2 the box 40 includes a battery 42 which is grounded as indicated in the drawing. Actually the battery may comprise the storage battery of the oil delivery truck. The battery is connected through a manual toggle switch 44 with a wire 46 which in turn is connected with the wire 32 leading to the fixed contact 22 of the pressure-responsive unit. Included in the wire 46 is a relay winding 48. The relay has contacts 50 adapted to close when the relay is energized. One of the relay contacts is connected to the line 46 and the other is connected to a signal lamp 52 and an audible signal device 54, herein indicated as a bell. The signal devices 52 and 54 are in parallel with each other and are connected to ground.

It will be seen that when the pressure on the bellows increases sufficiently to bring contact 20 into engagement with 22, the relay 48 will be energized through a circuit including the battery, the relay winding, connection 32, contacts 22 and 20, and connection 30 to ground. Then the signal devices 52 and 54 will operate.

As heretofore noted, it is desirable to provide means whereby the operator may determine whether the system is in working order. To this end there is connected to the wire 46 a second wire 56 including a button switch 58 which is connected through a wire 60 with the wire 28 leading to the solenoid 26. The wires 46 and 60 are enclosed within the cable 36. A test lamp 64 is connected between the wire 46 and ground. With the toggle switch 44 closed (the tank being empty), if the operator presses the push button switch 58, the solenoid is energized by circuit traced from the battery 42 through switch 44, switch 58, wire 60, wire 28, the solenoid 26 and the wire 30 to ground. The solenoid being thus energized, attracts the contact 20 into engagement with contact 22 and operates the signals 52 and 54. It is essential that the signals should not operate under test if the main signals 52 and 54 would fail to operate on the filling operation. Hence the size of the solenoid is such that it will exert somewhat less force on the contact 20 than the maximum available force from the pressure due to a completely filled tank. Furthermore, it is possible that the battery voltage may be low so as to give a marginal response under the actual filling condition. It is desirable under such circumstances to discard any indications that might be considered uncertain. To this end a resistance 62 is included in series with the battery. The current taken by the solenoid causes such a resistance drop through the resistor 62, that the relay 48 will not be energized if the battery is low. Actually the resistor 62 is not necessary as a separate element if dry cells were used, since in that case the element 62 represents the internal resistance of the cell.

A small indicating lamp 64 is conveniently connected between the line 46 and ground to indicate whenever the main switch 44 is closed.

The operation is as follows: the driver upon reaching the location, plugs in the cable 36 and closes the main switch 44. To check the equipment he presses the push button 58. Whether or not the signals 52 and 54 operate will depend on whether the system is in working order. If the pressure-responsive unit is in order and the battery is not low, the signals will operate when the button 58 is held down.

The driver then fills the tank. As the tank fills up, the bellows 14 becomes submerged and the hydrostatic pressure on the bellows increases. When the oil reaches a certain level, as indicated generally by the dot-and-dash line, the bellows is sufficiently compressed to close the contacts 20 and 22, thereby energizing the relay to cause operation of the signals. The supply may then be shut off, with assurance that the tank is substantially filled, and without danger of spilling.

It will be observed that the vent is normally unobstructed, and this permits filling of the tank at the maximum rate, since the outflowing air is not called upon to supply any energy, as contrasted with sound-producing devices in the vent pipe.

The device of the present invention will give an indication if the vent pipe is plugged. In that case the air pressure within the tank increases sufficiently to compress the bellows and give an immediate signal. This increase in pressure occurs before any substantial quantity of oil is introduced into the tank and hence the oil supply may be immediately shut off without danger of a flowback.

The invention also permits any desired relative location for the filling and vent pipes. For example, in the case of a building at a considerable distance from the highway, it may be desirable to have the filling pipe extend to a point near the highway, while the vent should terminate near the building, in which case a vent whistle might not be heard, especially in a noisy area. According to the present invention, the cable 33 would be extended to a suitable weatherproof coupling adjacent to the fill pipe.

Having thus described the invention, I claim:

1. A liquid level indicator for a tank comprising a pressure-responsive bellows to be received in the tank to be compressed under the hydrostatic pressure due to a filled tank, a fixed contact member within the bellows, a movable contact member carried by the bellows and adapted to engage the fixed contact member upon compression of the bellows by hydrostatic pressure, a magnet surrounding the contacts and operable when energized to close the contacts when the tank is not filled, a relay operable by closure of the contacts, a signal device operated by the relay, and a test switch for closing a circuit to the magnet.

2. A liquid level indicator for a tank comprising a pressure-responsive bellows to be received in the tank to be compressed under the hydrostatic pressure due to a filled tank, a fixed contact member within the bellows, a movable contact member carried by the bellows and adapted to engage the fixed contact member upon compression of the bellows by hydrostatic pressure, a magnet surrounding the contacts and operable when energized to close the contacts when the tank is not filled, a relay operable by closure of the contacts, a signal device operated by the relay, and a test switch for closing a circuit to the magnet, and resistance included in the circuit to lower the voltage of the relay by reason of the current taken by the magnet, whereby the signal will not be operated under marginal conditions when the test switch is closed.

ROBERT C. HILLIARD.

REFERENCES CITED

The following references are of record in the file of this patent:

UNITED STATES PATENTS

| Number | Name | Date |
|---|---|---|
| 674,867 | Howe | May 28, 1901 |
| 1,036,869 | Marshak | Aug. 27, 1912 |
| 1,071,171 | Nolen | Aug. 26, 1913 |
| 1,199,340 | Block | Sept. 26, 1916 |
| 1,822,203 | Collins | Sept. 8, 1931 |
| 2,407,378 | Miller et al. | Sept. 10, 1946 |
| 2,423,970 | Gardner | July 15, 1947 |
| 2,468,945 | Sasser | May 3, 1949 |